US012785100B2

(12) United States Patent
Zhang et al.

(10) Patent No.: US 12,785,100 B2
(45) Date of Patent: Nov. 3, 2026

(54) FLUORINE-CONTAINING COPOLYMER AND SECONDARY BATTERY COMPRISING THE SAME

(71) Applicant: CONTEMPORARY AMPEREX TECHNOLOGY (HONG KONG) LIMITED, Hong Kong (CN)

(72) Inventors: Ming Zhang, Ningde (CN); Tongxian Zhang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 939 days.

(21) Appl. No.: 18/145,572

(22) Filed: Dec. 22, 2022

(65) Prior Publication Data

US 2023/0170483 A1 Jun. 1, 2023

Related U.S. Application Data

(63) Continuation of application No. PCT/CN2021/134330, filed on Nov. 30, 2021.

(51) Int. Cl.

| | |
|---|---|
| ***H01M 4/62*** | (2006.01) |
| ***H01M 4/36*** | (2006.01) |
| ***H01M 4/485*** | (2010.01) |
| ***H01M 4/505*** | (2010.01) |
| ***H01M 4/525*** | (2010.01) |
| ***H01M 4/58*** | (2010.01) |
| ***H01M 10/0525*** | (2010.01) |
| *H01M 4/02* | (2006.01) |

(52) U.S. Cl.

CPC ........... *H01M 4/622* (2013.01); *H01M 4/364* (2013.01); *H01M 4/485* (2013.01); *H01M 4/505* (2013.01); *H01M 4/525* (2013.01); *H01M 4/5825* (2013.01); *H01M 4/625* (2013.01); *H01M 10/0525* (2013.01); *H01M 2004/028* (2013.01)

(58) Field of Classification Search

CPC ........ H01M 4/62; H01M 4/622; H01M 4/625; H01M 4/36; H01M 4/364; H01M 4/485; H01M 4/505; H01M 4/525; H01M 4/58; H01M 4/5825; H01M 10/0525

USPC .................................................... 429/231.95

See application file for complete search history.

(56) References Cited

U.S. PATENT DOCUMENTS

| | | | | |
|---|---|---|---|---|
| 2005/0058907 A1* | 3/2005 | Kurihara et al. | ..... | H01M 4/621 252/182.1 |
| 2012/0171579 A1* | 7/2012 | Tsai et al. | ........... | H01M 4/5815 429/207 |
| 2016/0118663 A1* | 4/2016 | Maruhashi | ............ | H01M 4/139 427/58 |
| 2023/0032775 A1* | 2/2023 | Ji et al. | ............... | H01M 4/0404 |

FOREIGN PATENT DOCUMENTS

| | | | | |
|---|---|---|---|---|
| CN | 102225980 A | 10/2011 | | |
| CN | 102225980 B | 11/2012 | | |
| CN | 104752683 A | 7/2015 | | |
| CN | 106299249 B | 11/2019 | | |
| CN | 110838573 A | 2/2020 | | |
| CN | 111509232 A | 8/2020 | | |
| CN | 112952092 A | 6/2021 | | |
| CN | 113540394 A | 10/2021 | | |
| JP | 2001135353 A | 5/2001 | | |
| WO | WO 2021015230 A1 * | 1/2021 | ........ | H01M 10/0562 |

OTHER PUBLICATIONS

Machine translation of WO 2021015230 A1 (Year: 2021).*

The World Intellectual Property Organization (WIPO) International Search Report for PCT/CN2021/134330 Jun. 24, 2022 4 Pages (including translation).

The European Patent Office (EPO) The Extended European Search Report for Application No. 21943314.1 May 21, 2025 13 Pages.

China National Intellectual Property Administration (CNIPA) The First Office Action for Application No. 202180093378.9 May 21, 2026 12 Pages (including translation).

* cited by examiner

*Primary Examiner* — Kevin P Kerns

(74) *Attorney, Agent, or Firm* — ANOVA LAW GROUP, PLLC

(57) ABSTRACT

A fluorine-containing copolymer has a weight average molecular weight of 600,000 to 2,000,000, and is represented by following formula:

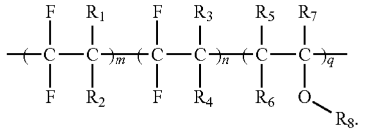

One of $R_1$ and $R_2$ is H, or unsubstituted or non-perfluoro-substituted C1-C8 linear or branched alkyl, and the other is H, F, or C1-C8 linear or branched alkyl substituted or unsubstituted with fluorine. $R_3$ and $R_4$ are each independently selected from H, F, or C1-C8 linear or branched alkyl substituted or unsubstituted with fluorine. $R_5$-$R_7$ are each independently selected from H, F, or C1-C8 linear or branched alkyl substituted or unsubstituted with fluorine. $R_8$ is perfluoro-substituted C1-C8 linear or branched alkyl. m, n, and q are molar proportions of respective repeating units in the fluorine-containing copolymer. M≥90%, 0<n<100%, and 0<q<100%.

16 Claims, 3 Drawing Sheets

FLUORINE-CONTAINING COPOLYMER AND SECONDARY BATTERY COMPRISING THE SAME

CROSS-REFERENCE TO RELATED APPLICATION

This application is a continuation of International Application No. PCT/CN2021/134330, filed on Nov. 30, 2021, the entire content of which is incorporated herein by reference.

TECHNICAL FIELD

The present application relates to the technical field of batteries, and in particular to a fluorine-containing copolymer and a secondary battery, a battery module, a battery pack and an electrical apparatus comprising the same.

BACKGROUND ART

In recent years, with the increasing demand for clean energy, secondary batteries are widely used in energy storage power systems such as water power, thermal power, wind power and solar power stations, as well as power tools, vehicles, military equipment, aerospace and other fields. As the fields of application of secondary batteries are greatly widened, higher requirements are raised for their performances.

SUMMARY

The present disclosure is accomplished by the present inventors through solving the above-mentioned problems.

According to a first aspect of the present application, a fluorine-containing copolymer is provided, wherein the fluorine-containing copolymer has a weight average molecular weight of 600,000 to 2,000,000, and is represented by the following formula:

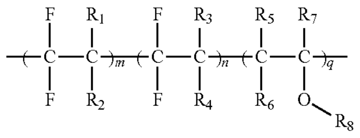

wherein any one of $R_1$ and $R_2$ is one selected from H and unsubstituted or non-perfluoro-substituted C1-C8 linear or branched alkyl, the other is H, F or C1-C8 linear or branched alkyl substituted or unsubstituted with fluorine;

$R_3$ and $R_4$ are each independently selected from H, F or C1-C8 linear or branched alkyl substituted or unsubstituted with fluorine;

$R_5$-$R_7$ are each independently selected from H, F or C1-C8 linear or branched alkyl substituted or unsubstituted with fluorine, $R_8$ is one of perfluoro-substituted C1-C8 linear or branched alkyl; and m, n and q are the molar proportions of each repeating unit in the fluorine-containing copolymer, wherein m≥90%, 0<n<100%, and 0<q<100%.

When the above-mentioned fluorine-containing copolymers are applied to the positive electrode slurry to replace the binders in the existing technologies (such as the above-mentioned PVDF binders and the non-PVDF binders formed by copolymerizing such as acrylonitrile monomers with monomers such as acrylamides, acrylates and nitrogen-containing heterocycles), the resulting positive electrode slurry has good fluidity due to no physical and chemical gelation phenomenon within at least 24 hours of standing. In addition, the fluorine-containing copolymer provided in the present application has good flexibility due to the fluorine-substituted ether group introduced into the molecular chain while maintaining good adhesiveness, so that the resulting positive electrode sheet has good flexibility.

According to any aspect of the present application, wherein m+n=90%-99.9% and q=0.1%-10%, optionally m+n=95%-99.5% and q=0.5%-5%. When m, n and q are within the above numerical ranges, the fluidity of the positive electrode slurry can be maintained while ensuring that the fluorine-containing copolymer has good adhesiveness when used as a binder.

According to any aspect of the present application, wherein each of $R_5$-$R_7$ is F and $R_8$ is trifluoromethyl or pentafluoroethyl. When the above-mentioned groups are selected for each of $R_5$-$R_7$, and the above-mentioned fluorine-containing copolymer is used as a binder in the positive electrode slurry, the physical and chemical gelation for the positive electrode slurry can be better suppressed, the good adhesiveness can be maintained and the flexibility of the resulting positive electrode sheet can be improved.

According to any aspect of the present application, wherein the weight average molecular weight of the fluorine-containing copolymer is 800,000 to 1,500,000. By setting the weight average molecular weight of the fluorine-containing copolymer to be 800,000 or more, the adhesiveness of the fluorine-containing copolymer can be well ensured when used as a binder, and the problem that the adhesiveness is greatly reduced due to the low weight average molecular weight can be avoided. In addition, by setting the weight average molecular weight of the fluorine-containing copolymer to be 1,500,000 or less, the solubility of the fluorine-containing copolymer in a solvent such as N-methylpyrrolidone (NMP) used as a positive electrode slurry can be well ensured, thereby avoiding a decrease in productivity due to its low solubility and ensuring operability.

According to any aspect of the present application, wherein the fluorine-containing copolymer is one selected from the following Structural formula 1

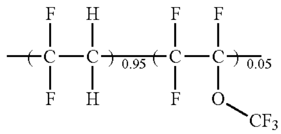

Structural formula 2

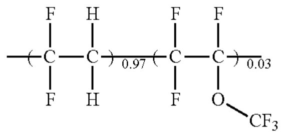

Structural formula 3

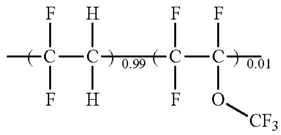

Structural formula 4

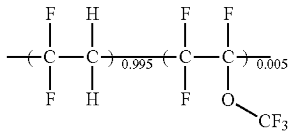

-continued

Structural formula 5

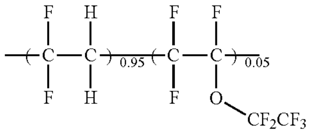

Structural formula 6

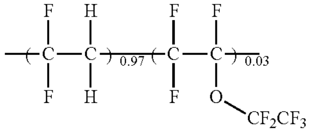

Structural formula 7

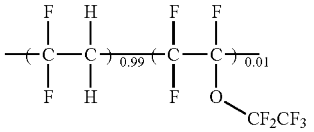

Structural formula 8

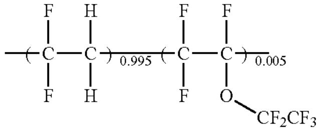

Structural formula 9

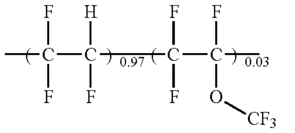

Structural formula 10

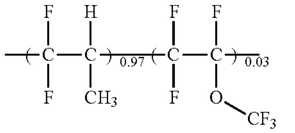

Structural formula 11

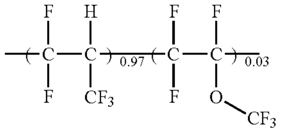

Structural formula 12

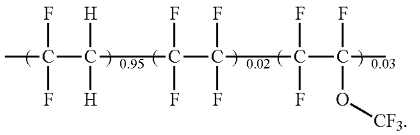

When the above-mentioned fluorine-containing copolymer is used as a binder in the positive electrode slurry, the physical and chemical gelation for the positive electrode slurry can be better suppressed, the good adhesiveness can be maintained and the flexibility of the resulting positive electrode sheet can be improved.

According to a second aspect of the present application, a positive electrode slurry comprising a positive electrode material and a binder is provided, wherein the binder includes the fluorine-containing copolymer according to any one of the above aspects. As mentioned above, when the above-mentioned fluorine-containing copolymer is applied to the positive electrode slurry to replace the binder in the existing technologies, the resulting positive electrode slurry has good fluidity due to no physical and chemical gelation phenomenon within at least 24 hours of standing. Thereby, the operability and productivity in the production process of the battery electrode sheet can be improved.

According to any aspect of the present application, wherein the positive electrode material comprises a carbon-coated lithium-containing phosphate material as the first positive electrode active material. When the fluorine-containing copolymer according to the present application is applied as a binder to a positive electrode slurry comprising the above-mentioned active material, the effect of suppressing physical gelation of the positive electrode slurry is more remarkable.

According to the above aspect of the present application, wherein the positive electrode material further comprises a lithium supplement, and the pH value of the lithium supplement is greater than or equal to 10.0. When the fluorine-containing copolymer according to the present application is applied as a binder to a positive electrode slurry comprising the above-mentioned lithium supplement, the effect of suppressing chemical gelation of the positive electrode slurry is more remarkable.

According to any aspect of the present application, wherein the positive electrode material comprises a second positive electrode active material represented by the following general formula $$Li_{1+a}[Ni_xCo_yMn_zM_b]O_2,$$

where $0.6<x<1$, $0\leq y<0.3$, $0\leq z<0.3$, $0<a<0.2$, $0<b<0.2$, and $x+y+z+b=1$, M is one or more selected from Mg, Ca, Sb, Ce, Ti, Zr, Sr, Al, Zn, Mo, and B, optionally, $0.8<x<1$, and the pH value of the positive electrode material is greater than or equal to 10.0.

When the positive electrode slurry comprises strongly alkaline components, the positive electrode slurry is prone to chemical gelation. Therefore, when the fluorine-containing copolymer according to the present application is applied as a binder to a positive electrode slurry comprising the above-mentioned positive electrode material, the effect of suppressing chemical gelation of the positive electrode slurry is more remarkable.

According to the above aspect of the present application, wherein the positive electrode material further comprises a lithium supplement.

According to any aspect of the present application, wherein the positive electrode material further comprises a second positive electrode active material represented by the following general formula, $$Li_{1+a}[Ni_xCo_yMn_zM_b]O_2,$$

where $0.6<x<1$, $0\leq y<0.3$, $0\leq z<0.3$, $0<a<0.2$, $0<b<0.2$, and $x+y+z+b=1$, M is one or more selected from Mg, Ca, Sb, Ce, Ti, Zr, Sr, Al, Zn, Mo, and B, optionally, $0.8<x<1$, and the pH value of the second positive electrode active material is greater than or equal to 10.0.

According to the above aspect of the present application, wherein the positive electrode material further comprises a lithium supplement.

According to any aspect of the present application, wherein the first positive electrode active material has a volume average particle diameter Dv50 of 2 μm or less. When the first positive electrode active material has a volume average particle diameter Dv50 of 2 μm or less, the particles of the first positive electrode active material are more likely to undergo physical gelation due to the smaller particle diameter. Therefore, when the fluorine-containing copolymer according to the present application is applied as a binder to a positive electrode slurry comprising the above-mentioned first positive electrode active material, the effect of suppressing physical gelation of the positive electrode slurry is more remarkable.

According to any aspect of the present application, wherein the lithium supplement comprises at least one selected from $Li_2C_2$, $Li_3N$, $Li_2S$, $Li_6CoO_4$, $Li_5FeO_4$, $Li_3VO_4$, $Li_2MoO_3$, $Li_2RuO_3$, $Li_2MnO_2$, $Li_2NiO_2$, and $Li_2Cu_xNi_{1-x}M_yO_2$, where $0<x\leq1$, and $0\leq y<0.1$, and M is at least one selected from Zn, Sn, Mg, Fe, and Mn. When the above-mentioned lithium supplement is used, the capacity characteristics of the secondary battery can be favorably improved.

According to a third aspect of the present application, a secondary battery comprising a positive electrode sheet having a positive electrode active material layer is provided, wherein the positive electrode active material layer is obtained by coating and drying the positive electrode slurry according to any one of the above-mentioned aspects.

According to a fourth aspect of the present application, a battery module including the secondary battery according to the above-mentioned third aspect is provided.

According to a fifth aspect of the present application, a battery pack including the battery module according to the above-mentioned fourth aspect is provided.

According to a sixth aspect of the present application, an electrical apparatus including at least one of the secondary battery according to the above-mentioned third aspect, the battery module according to the above-mentioned fourth aspect, or the battery pack according to the above-mentioned fifth aspect is provided.

DESCRIPTION OF REFERENCE NUMERALS

Figure 1:
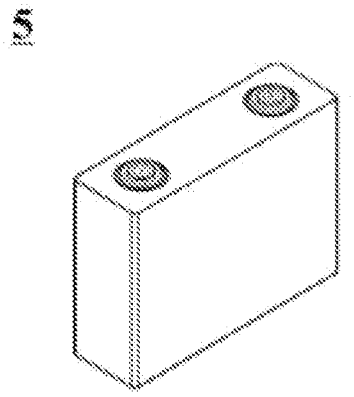
FIG. 1 is a schematic view of a secondary battery according to an embodiment of the present application.

1 battery pack; 2 upper box; 3 lower box; 4 battery module; 5 secondary battery; 51 case; 52 electrode assembly; 53 top cover assembly.

DETAILED DESCRIPTION

Hereinafter, the electrode sheet of the present application is described, where unnecessary detailed description may be omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the following descriptions and embodiments are provided for fully understanding the present application by those skilled in the art, and are not intended to limit the subject matter recited in the claims.

Unless otherwise specified, all the embodiments and optional embodiments of the present application can be combined with each other to form new technical solutions.

Unless otherwise specified, all technical features and optional technical features of the present application can be combined with each other to form a new technical solution.

The fluorine-containing copolymer and the secondary battery comprising the same, the battery module, the battery pack and the electrical apparatus are detailed below.

Commercial positive electrode active materials are mainly lithium-containing phosphate materials (such as $LiFePO_4$) and ternary (nickel, cobalt and manganese) positive electrode active materials. $LiFePO_4$ has smaller particles and is often covered with carbon on the surface. The PVDF binder as the positive electrode binder used in conjunction with it is generally VDF monomers (vinylidene fluoride monomers) homopolymerized via emulsion polymerization or suspension polymerization, and the vinyl monomers containing polar functional groups are not added during polymerization to avoid the interactions such as hydrogen bonds being generated between the polar functional groups in the molecular chain of PVDF binder and the hydroxyl groups ($OH^-$) on the surface of the active material particles during mixing the positive electrode slurry, which results in physical gelation of the positive electrode slurry. In addition, when $LiFePO_4$ is used in conjunction with graphite, there is a problem of rapid decay of the battery in early-cycle stage. In order to solve this problem, adding a lithium supplement to the positive electrode is an effective method. However, since most of the lithium supplements are lithium-rich materials with strong alkalinity, when the positive electrode slurry contains both small particles of carbon-coated $LiFePO_4$ and a lithium supplement with strong alkalinity, it is a challenging problem to make the positive electrode slurry have good fluidity (without either physical or chemical gelation) for a certain period of time. Further, it is a more challenging problem to ensure that the resulting positive electrode sheet has good flexibility and high peel strength while making the positive electrode slurry have good fluidity for a certain period of time.

The ternary positive electrode active material has a stronger alkalinity. Since the molecular chain of the homopolymerized PVDF binder is easy to remove the HF molecule under a strong alkaline environment and form a continuous double bond on the molecular chain, and the double bond may be broken and cross-linked with other molecular chains, there may be a problem that the positive electrode slurry is prone to chemical gelation, affecting the normal batching, coating and subsequent processes. In order to deal with the chemical gelation caused by alkalinity, there are two existing methods: one method is to add a small amount of special monomers during the polymerization of PVDF binders to obtain modified PVDF binders, thereby reducing the dehydrofluorination from molecular chains of PVDF binder and inhibiting chemical gelation, in which one type of monomers is fluorine-containing olefins such as hexafluoropropylene, tetrafluoroethylene and chlorotrifluoroethylene; another type of monomers is vinyl monomers containing polar functional groups such as carboxyl, sulfonic and amine groups; the other method is to use non-PVDF polymers formed by copolymerizing acrylonitrile monomers with monomers such as acrylamides, acrylates and nitrogen-containing heterocycles.

When the VDF monomers (vinylidene fluoride monomers) homopolymerized via emulsion polymerization or suspension polymerization are used as the binder, the above-mentioned binder is easy to remove the HF molecules to form double bonds and undergo cross-linking reaction resulting in a chemical gelation due to the strong alkalinity of the lithium supplement. When using a PVDF modified by copolymerizing VDF monomers (vinylidene fluoride monomers) with vinyl monomers containing polar functional groups such as carboxyl, sulfonic, and amine groups, the interactions such as hydrogen bonds are generated between polar functional groups in the modified PVDF molecular chain and hydroxyl groups ($OH^-$) on the particle surface, resulting in physical gelation of the positive electrode slurry. When using a PVDF modified by copolymerizing VDF monomers (vinylidene fluoride monomers) with fluorine-containing olefin monomers such as hexafluoropropylene, tetrafluoroethylene, and chlorotrifluoroethylene, the adhesiveness of the resulting PVDF may be decreased. In addition, when using non-PVDF polymers formed by copolymerizing acrylonitrile monomers with monomers such as acrylamides, acrylates, and nitrogen-containing heterocycles, the resulting electrode sheets are brittle and easy to break since the polarity of a large number of polar functional groups such as nitrile functional groups will also result in physical gelation, and the $T_g$ (glass transition temperature) of such polymers is higher.

The first embodiment of the present application can provide a fluorine-containing copolymer having the weight average molecular weight of 600,000 to 2,000,000 and represented by the following formula:

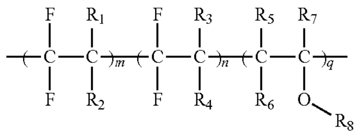

wherein any one of $R_1$ and $R_2$ is one selected from H and unsubstituted or non-perfluoro-substituted C1-C8 linear or branched alkyl, the other is H, F or C1-C8 linear or branched alkyl substituted or unsubstituted with fluorine;

$R_3$ and $R_4$ are each independently selected from H, F or C1-C8 linear or branched alkyl substituted or unsubstituted with fluorine;

$R_5$-$R_7$ are each independently selected from H, F or C1-C8 linear or branched alkyl substituted or unsubstituted with fluorine, $R_8$ is one of perfluoro-substituted C1-C8 linear or branched alkyl; and m, n and q are the molar proportions of each repeating unit in the fluorine-containing copolymer, wherein $m \geq 90\%$, $0<n<100\%$, and $0<q<100\%$.

As mentioned above, when the above-mentioned fluorine-containing copolymer is applied to the positive electrode slurry to replace the binder in the existing technologies, the resulting positive electrode slurry has good fluidity due to no physical and chemical gelation phenomenon within at least 24 hours of standing. The reasons are as follows: compared with conventional PVDF binders, since the fluorine-substituted ether group is introduced into the molecular chain, the repeating unit with this substituent replaces the repeating unit $—CH_2—CF_2—$, inhibiting the continuous dehydrofluorination in the molecular chain, reducing the ratio of cross-linking sites (i.e. reducing the rate of occurrence of double bonds), thereby preventing the binder from dehydrofluorination and further chemical gelation during the preparation of the positive electrode slurry due to the strong alkalinity (pH>10.0) of the positive electrode material; on the other hand, compared with polar functional groups such as carboxyl, sulfonic, and amine groups, since the perfluoroether functional group in the molecular chain of the fluorine-containing copolymer according to the present application is less polar, the hydrogen bond between the molecular chain of the fluorine-containing copolymer in the positive electrode slurry and the hydroxyl group ($OH^-$) attached to the surface of the active material such as carbon-coated $LiFePO_4$ is weakened, avoiding the loss of fluidity for the positive electrode slurry due to the physical gelation during standing. Therefore, using the fluorine-containing copolymer according to the present application in stead of the traditional PVDF binder can ensure that the positive electrode slurry will not lose fluidity due to physical and chemical gelation within a certain period of time (at least 24 hours) after preparation. In addition, the fluorine-containing copolymer provided in the present application has good flexibility due to the fluorine-substituted ether group introduced into the molecular chain while maintaining good adhesiveness, so that the resulting positive electrode sheet has good flexibility. For example, the positive electrode sheet prepared by using the fluorine-containing copolymer according to the present application as a binder can be opaque to light when folded in half for at least three times after pressing.

In the present application, the weight average molecular weight of the fluorine-containing copolymer is 600,000 to 2,000,000. By setting the weight average molecular weight of the fluorine-containing copolymer to be 600,000 or more, the adhesiveness of the fluorine-containing copolymer can be ensured when used as a binder, and the problem that the adhesiveness is greatly reduced due to the low weight average molecular weight can be avoided. In addition, by setting the weight average molecular weight of the fluorine-containing copolymer to be 2,000,000 or less, the solubility of the fluorine-containing copolymer in a solvent such as N-methylpyrrolidone (NMP) used as a positive electrode slurry can be ensured, thereby avoiding a decrease in productivity due to its low solubility and ensuring operability. Optionally, the weight average molecular weight of the fluorine-containing copolymer may be 700,000-1,900,000, 800,000-1,800,000, 900,000-1,700,000, 1,000,000-1,600,000, 1,100,000-1,500,000, 1,200,000-1,400,000, 1,300,000-1,500,000, 800,000-1,450,000, 800,000-1,500,000, 850,000-1,350,000, 950,000-1,250,000, 1,050,000-1,250,000, 1,150,000-1,450,000, 1,050,000-1,350,000, 1,150,000-1,450,000, 1,150,000-1,250,000, and 1,250,000-1,450,000.

In the present application, any one of $R_1$ and $R_2$ is one selected from H, unsubstituted or non-perfluoro-substituted C1-C8 linear or branched alkyl. "Unsubstituted or non-perfluoro-substituted C1-C8 linear or branched alkyl" means that the C1-C8 linear or branched alkyl is not substituted with any substituent or is only substituted with fluorine atoms but not completely substituted with fluorine atoms. By controlling any one of $R_1$ and $R_2$ to be one selected from H, unsubstituted or non-perfluoro-substituted C1-C8 linear or branched alkyl and adjusting m to be greater than or equal to 80%, the good adhesiveness of the fluorine-containing copolymer as a binder can be maintained. When both $R_1$ and $R_2$ are perfluoro-substituted alkyl groups or F or when m is less than 80%, the resulting copolymer may have reduced adhesiveness, thereby failing to provide excellent adhesiveness when applied as a binder to positive electrode slurry.

In addition, the fluorine-containing copolymer provided in the present application has good flexibility due to the fluorine-substituted ether group introduced into the molecular chain, so that the resulting positive electrode sheet has good flexibility. For example, the positive electrode sheet prepared by using the fluorine-containing copolymer according to the present application as a binder can be opaque to light when folded in half for at least three times after pressing.

In some embodiments, m+n=90%-99.9% and q=0.1%-10%, optionally m+n=91%-99.8% and q=0.2%-9%, m+n=92%-99.7% and q=0.3%-8%, m+n=93%-99.9% and q=0.1%-7%, m+n=94%-99.6% and q=0.4%-6%, m+n=95%-99.3% and q=0.7%-5%, m+n=96%-99.9% and q=0.1%-4% and m+n=95%-99.5% and q=0.5%-5%.

In some embodiments, from the viewpoints of suppressing physical and chemical gelation of the positive electrode slurry and maintaining good adhesion and improving the flexibility of the resulting positive electrode sheet when the above-mentioned fluorine-containing copolymer is used as a binder in the positive electrode slurry, in some embodiments, each of $R_5$-$R_7$ is F and, in some embodiments, $R_8$ is trifluoromethyl or pentafluoroethyl.

In some embodiments, from the viewpoints of suppressing physical and chemical gelation and maintaining adhesiveness and improving the flexibility of the prepared positive electrode sheet when the above-mentioned fluorine-containing copolymer is used as a binder in a positive electrode slurry, it is contemplated that the fluorine-containing copolymer may contain Structural formula 1

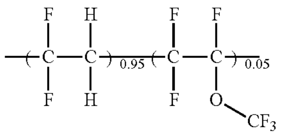

Structural formula 2

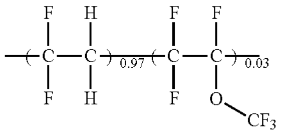

Structural formula 3

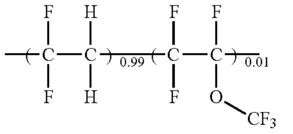

Structural formula 4

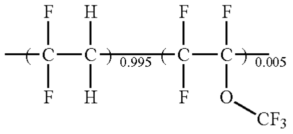

Structural formula 5

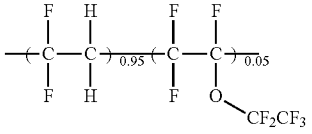

Structural formula 6

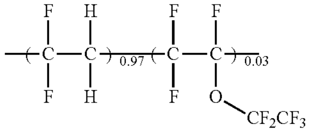

-continued

Structural formula 7

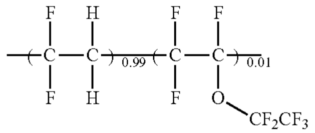

Structural formula 8

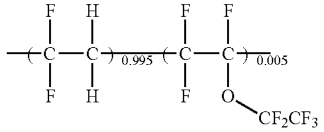

Structural formula 9

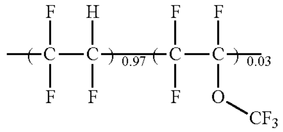

Structural formula 10

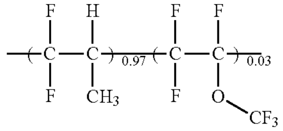

Structural formula 11

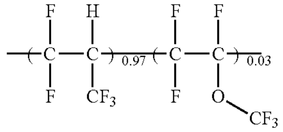

Structural formula 12

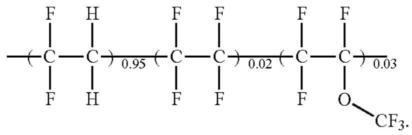

The second embodiment of the present application can provide a positive electrode slurry comprising a positive electrode material and a binder, wherein the binder includes the fluorine-containing copolymer according to any one of the above embodiments.

As mentioned above, when the above-mentioned fluorine-containing copolymer is applied to the positive electrode slurry to replace the binder in the existing technologies, the resulting positive electrode slurry has good fluidity due to no physical and chemical gelation phenomenon within at least 24 hours of standing. Thereby, the operability and productivity in the production process of the battery electrode sheet can be improved.

In some embodiments, the positive electrode material comprises a carbon-coated lithium-containing phosphate material as the first positive electrode active material. The above-mentioned lithium-containing phosphate material may be lithium iron phosphate ($LiFePO_4$), lithium manganese iron phosphate, lithium vanadium phosphate, and the like. Since the surface of the carbon coated on the surface of the above active materials has hydroxyl functional groups, these active materials are more likely to interact with the polar functional groups in the molecular chains of conventional PVDF binders to generate hydrogen bonds, thereby causing physical gelation. However, when the above-mentioned fluorine-containing copolymer according to the present application is used as the binder for the positive electrode slurry, since the perfluoroether functional group in the molecular chain of the fluorine-containing copolymer according to the present application is less polar, the hydrogen bond between the molecular chain of the fluorine-containing copolymer in the positive electrode slurry and the hydroxyl group ($OH^-$) attached to the surface of the active material such as carbon-coated $LiFePO_4$ is weakened, avoiding the loss of fluidity for the positive electrode slurry due to the physical gelation during standing. Therefore, when the fluorine-containing copolymer according to the present application is applied as a binder to a positive electrode slurry comprising the above-mentioned active material, the effect of suppressing physical gelation of the positive electrode slurry is more remarkable.

In some embodiments, the positive electrode material further comprises a lithium supplement, and the pH value of the lithium supplement is greater than or equal to 10.0; optionally, the pH value of the lithium supplement is greater than or equal to 10.5, 11.0, 11.5, 12.0, 12.5, 13.0 and 13.5. When a lithium supplement with a pH value of 10.0 or more is used in the positive electrode slurry, since the above lithium supplement has a strong alkalinity (pH>10.0), conventional PVDF binders are easy to remove HF molecules and form continuous double bonds on the molecular chains, and the double bonds may be broken and cross-linked with other molecular chains, so that there may be a problem that the positive electrode slurry is prone to chemical gelation. In contrast, in the present application, since the fluorine-substituted ether group is introduced into the molecular chain of the above-mentioned fluorine-containing copolymer as a binder, the repeating unit with this substituent replaces the repeating unit $—CH_2—CF_2—$, inhibiting the continuous dehydrofluorination in the molecular chain, reducing the ratio of cross-linking sites (i.e. reducing the rate of occurrence of double bonds), thereby preventing the binder from dehydrofluorination and further chemical gelation during the preparation of the positive electrode slurry due to the strong alkalinity (pH>10.0) of the positive electrode material. Therefore, when the fluorine-containing copolymer according to the present application is applied as a binder to a positive electrode slurry comprising the above-mentioned lithium supplement, the effect of suppressing chemical gelation of the positive electrode slurry is more remarkable.

In some embodiments, the positive electrode material comprises a second positive electrode active material represented by the following general formula $$Li_{1+a}[Ni_xCo_yMn_zM_b]O_2,$$

where $0.6<x<1$, $0\leq y<0.3$, $0\leq z<0.3$, $0<a<0.2$, $0<b<0.2$, $x+y+z+b=1$, M is one or more selected from Mg, Ca, Sb, Ce, Ti, Zr, Sr, Al, Zn, Mo, and B, optionally, $0.8<x<1$, and the pH value of the positive electrode material is greater than or equal to 10.0; optionally, the pH value of the positive electrode material is greater than or equal to 10.5, 11.0, 11.5, 12.0, 12.5, 13.0 and 13.5; optionally, the positive electrode material may further comprise a lithium supplement.

As mentioned above, when the positive electrode slurry comprises strongly alkaline components, the positive electrode slurry is prone to chemical gelation. Therefore, when the fluorine-containing copolymer according to the present application is applied as a binder to a positive electrode slurry comprising the above-mentioned positive electrode material, the effect of suppressing chemical gelation of the positive electrode slurry is more remarkable.

In some embodiments, the first positive electrode active material has a volume average particle diameter Dv50 of 2 μm or less. When the first positive electrode active material has a volume average particle diameter Dv50 of 2 μm or less, the particles of the first positive electrode active material are more likely to undergo physical gelation due to the smaller particle diameter. Therefore, when the fluorine-containing copolymer according to the present application is applied as a binder to a positive electrode slurry comprising the above-mentioned first positive electrode active material, the effect of suppressing physical gelation of the positive electrode slurry is more remarkable. Optionally, the volume average particle diameter Dv50 of the first positive electrode active material may satisfy ≤1.5 μm, ≤1.0 μm, ≤0.5 μm, ≤1.2 μm, ≤1.3 μm and ≤1.4 μm. In some embodiments, the above lithium supplement may comprise at least one selected from $Li_2C_2$, $Li_3N$, $Li_2S$, $Li_6CoO_4$, $Li_5FeO_4$, $Li_3VO_4$, $Li_2MoO_3$, $Li_2RuO_3$, $Li_2MnO_2$, $Li_2NiO_2$, $Li_2Cu_xNi_{1-x}M_yO_2$, where $0<x\leq 1$, $0\leq y<0.1$, and M is at least one selected from Zn, Sn, Mg, Fe, and Mn.

The third embodiment of the present application can provide a secondary battery comprising a positive electrode sheet having a positive electrode active material layer, wherein the positive electrode active material layer is obtained by coating and drying the positive electrode slurry according to any one of the above-mentioned embodiments.

The present application provides a fluorine-containing copolymer represented by the above formula and having the weight average molecular weight of 600,000 to 2,000,000. When the above-mentioned fluorine-containing copolymers are applied to the positive electrode slurry to replace the binders in the existing technologies (such as the above-mentioned PVDF binders and the non-PVDF binders formed by copolymerizing such as acrylonitrile monomers with monomers such as acrylamides, acrylates and nitrogen-containing heterocycles), the resulting positive electrode slurry has good fluidity due to no physical and chemical gelation phenomenon within at least 24 hours of standing. In addition, the fluorine-containing copolymer provided in the present application has good flexibility due to the fluorine-substituted ether group introduced into the molecular chain while maintaining good adhesiveness, so that the resulting positive electrode sheet has good flexibility.

Detailed Description of Embodiments

The secondary battery, the battery module, the battery pack, and the electrical apparatus of the present application will be described in detail below with reference to the drawings.

In an embodiment of the present application, a secondary battery is provided. Generally, the secondary battery includes a positive electrode sheet, a negative electrode sheet, an electrolyte, and a separator. During the charge and discharge process of the battery, lithium ions are intercalated and deintercalated repeatedly between the positive electrode sheet and the negative electrode sheet. The electrolyte serves to conduct lithium ions between the positive electrode sheet and the negative electrode sheet. The separator is provided between the positive electrode sheet and the negative electrode sheet, and mainly functions to prevent a short circuit between the positive electrode and the negative electrode while allowing ions to pass through. Each constituent element of the secondary battery will be described in detail below.

[Positive Electrode Sheet]

The positive electrode sheet can include a positive electrode current collector and a positive electrode active material layer provided on at least one surface of the positive electrode current collector. The positive electrode active material layer can include a positive electrode active material and optionally a binder and a conductive agent. The binder includes the fluorine-containing copolymer of the present application.

By way of example, the positive electrode current collector has two opposite surfaces in the direction of its own thickness, and the positive electrode active material layer is provided on either or both of the two opposite surfaces of the positive electrode current collector.

In some embodiments, the positive electrode current collector can be a metal foil or a composite current collector. For example, an aluminum foil can be used as the metal foil. The composite current collector may comprise a high molecular material substrate and a metal layer formed on at least one surface of the high molecular material substrate. The composite current collector can be formed by forming the metal material (for example, aluminium, aluminium alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), and polyethylene (PE), etc.).

In some embodiments, the positive electrode active material layer can optionally include a conductive agent. For example, a conductive agent commonly used in the art can be used. The conductive agent may include at least one selected from superconducting carbon, acetylene black, carbon black, KETJEN BLACK®(a kind of carbon black), carbon nanotube, carbon nanorod, graphene, and carbon nanofiber.

In some embodiments, the positive electrode active material layer coated on the positive electrode current collector can be prepared by dispersing the components for preparing the positive electrode sheet, for example, the positive electrode active material, the conductive agent, the binder and any other components in a solvent (for example, N-methyl pyrrolidone) to form a positive electrode slurry; and applying the positive electrode slurry on a positive electrode current collector, followed by oven drying, cold pressing and other procedures, to obtain the positive electrode active material layer coated on the positive electrode current collector. Alternatively, in another embodiment, the positive electrode active material layer coated on the positive electrode current collector can be prepared by casting the positive electrode slurry for forming the positive electrode active material layer on a separate carrier, and then laminating a film peeled from the carrier on the positive electrode current collector.

[Negative Electrode Sheet]

The negative electrode sheet can include a negative electrode current collector and a negative electrode active material layer provided on at least one surface of the negative electrode current collector. The negative electrode active material layer can include a negative electrode active material, and optionally a binder, a conductive material, and other auxiliaries.

By way of example, the negative electrode current collector has two opposite surfaces in the direction of its own thickness, and the negative electrode active material layer is provided on either or both of the two opposite surfaces of the negative electrode current collector.

In some embodiments, the negative electrode current collector can be a metal foil or a composite current collector. For example, a copper foil can be used as the metal foil. The composite current collector may comprise a high molecular material substrate and a metal layer formed on at least one surface of the high molecular material substrate. The composite current collector can be formed by forming the metal material (for example, copper, copper alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), and polyethylene (PE), etc.).

In some embodiments, the negative electrode active material may be a negative electrode active material for batteries known in the art. For example, the negative electrode active material may include at least one of artificial graphite, natural graphite, soft carbon, hard carbon, silicon-based materials, tin-based materials, lithium titanate, or the like. The silicon-based material may be at least one selected from elemental silicon, a silicon-oxygen compound, a silicon-carbon composite, a silicon-nitrogen composite, and a silicon alloy. The tin-based material may be at least one selected from elemental tin, a tin-oxygen compound, and a tin alloy. However, the present application is not limited to these materials, and other conventional materials useful as negative electrode active materials for batteries can also be used. These negative electrode active materials may be used alone or in combination of two or more thereof.

In some embodiments, the negative electrode active material layer may also optionally include a binder. The binder may be at least one selected from styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode active material layer further optionally comprises a conductive agent. The conductive agent may be at least one selected from superconducting carbon, acetylene black, carbon black, KETJEN BLACK®(a kind of carbon black), carbon nanotube, carbon nanorod, graphene, and carbon nanofiber.

In some embodiments, the negative electrode active material layer may further optionally comprise other auxiliaries, for example, a thickener (e. g., sodium carboxymethyl cellulose (CMC-Na)) and the like.

In some embodiments, the negative electrode active material layer coated on the negative electrode current collector can be prepared by dispersing the components for preparing the negative electrode sheet, for example, the negative electrode active material, the conductive agent, the binder and any other components in a solvent (for example, deionized water) to form a negative electrode slurry; and applying the negative electrode slurry on a negative electrode current collector, followed by oven drying, cold pressing and other procedures, to obtain the negative electrode active material layer coated on the negative electrode current collector. Alternatively, in another embodiment, the negative electrode active material layer can be prepared by casting the negative electrode slurry for forming the negative electrode active material layer on a separate carrier, and then laminating a film peeled from the carrier on the negative electrode current collector.

[Electrolyte]

The electrolyte serves to conduct ions between the positive electrode sheet and the negative electrode sheet. The type of the electrolyte is not particularly limited in the present application, and can be selected according to needs. For example, the electrolyte may be in a liquid or gel state.

In addition, the electrolyte according to the embodiment of the present application may include an additive. The additive may include an additive commonly used in the art. The additive may include, for example, halogenated alkylene carbonates (e.g., ethylene difluorocarbonate), pyridine, triethyl phosphite, triethanolamine, cyclic ethers, ethylenediamine, ethylene glycol dimethyl ether, hexamethylphosphoric triamide, nitrobenzene derivatives, sulfur, quinoneimine dyes, N-substituted oxazolidinones, N,N-substituted imidazolidines, ethylene glycol dialkyl ethers, ammonium salts, pyrrole, 2-methoxyethanol or aluminum trichloride. In this case, based on the total weight of the electrolyte, the additive may be included in an amount of 0.1 wt % to 5 wt % or the amount of the additive may be adjusted by those skilled in the art according to actual needs.

In some embodiments, an electrolyte solution is used as the electrolyte. The electrolyte solution comprises an electrolyte salt and a solvent.

In some embodiments, the electrolyte salt can be at least one selected from lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro(oxalato)borate, lithium bis(oxalato)borate, lithium difluoro bis(oxalato)phosphate, and lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the secondary battery may include an outer package. The outer package can be used to encapsulate the above-mentioned electrode assembly and electrolyte.

In some embodiments, the outer package of the secondary battery may be a hard case, such as a hard plastic case, an aluminium case, a steel case, and the like. The outer package of the secondary battery can also be a soft pack, such as a bag-type soft pack. The material of the soft pack can be a plastic. Examples of the plastic include polypropylene, polybutylene terephthalate and polybutylene succinate, etc.

The shape of the secondary battery is not particularly limited in the present application, and it may be cylindrical, square, or any other shape. For example, FIG. 1 shows a secondary battery 5 with a square structure as an example.

Figure 2:
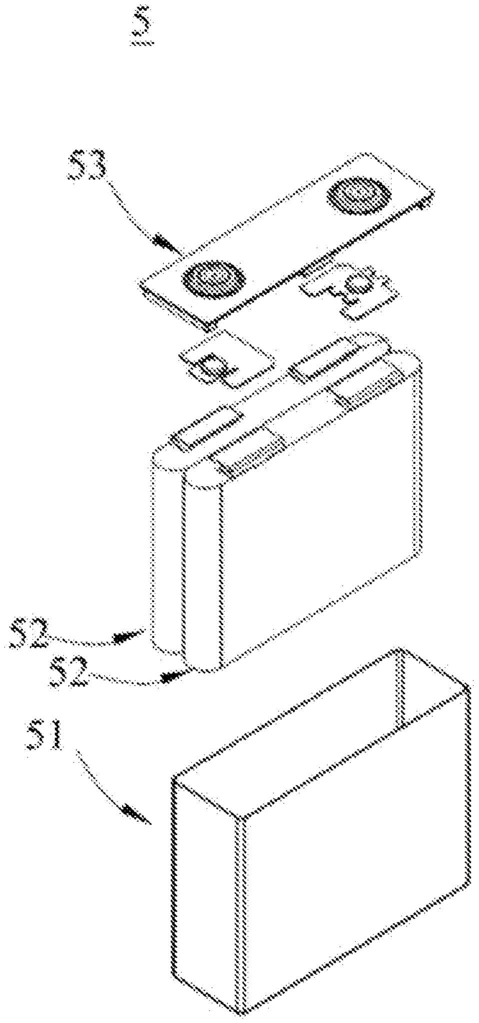
FIG. 2 is an exploded view of the secondary battery according to the embodiment of the present application shown in FIG. 1.

In some embodiments, referring to FIG. 2, the outer package may include a case 51 and a cover plate 53. Here, the case 51 includes a bottom plate and a side plate connected to the bottom plate, where the bottom plate and the side plate defines an accommodating cavity. The case 51 has an opening that communicates with the accommodating cavity, and the cover plate 53 can cover the opening to close the accommodating cavity. The positive electrode sheet, the negative electrode sheet, and the separator may be formed into an electrode assembly 52 by a winding process or a lamination process. The electrode assembly 52 is encapsulated within the accommodating cavity. The electrolyte solution impregnates the electrode assembly 52. The number of electrode assemblies 52 contained in the secondary battery 5 can be one or more, and can be selected by those skilled in the art according to actual needs.

In some embodiments, secondary batteries can be assembled into a battery module, the number of secondary batteries contained in the battery module can be one or more, and the specific number can be selected by those skilled in the art according to the application and capacity of the battery module.

Figure 3:
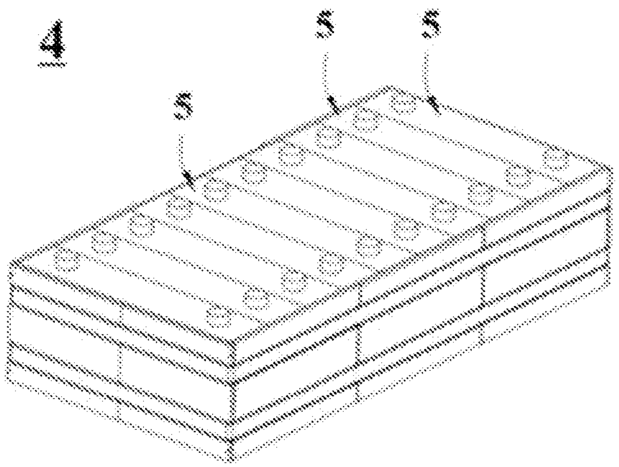
FIG. 3 is a schematic view of a battery module according to an embodiment of the present application.

FIG. 3 shows a battery module 4 as an example. Referring to FIG. 3, in the battery module 4, a plurality of secondary batteries 5 is sequentially arranged along the length direction of the battery module 4. Of course, any other arrangement of the plurality of secondary batteries 5 is also possible. Further, the plurality of secondary batteries 5 may further be fixed by fasteners.

Optionally, the battery module 4 can further include a case having an accommodating space, in which the plurality of secondary batteries 5 are accommodated.

In some embodiments, the above-mentioned battery modules can further be assembled into a battery pack. The number of battery module contained in the battery pack may be one or more, and can be selected by those skilled in the art according to the use and capacity of the battery pack.

Figure 4:
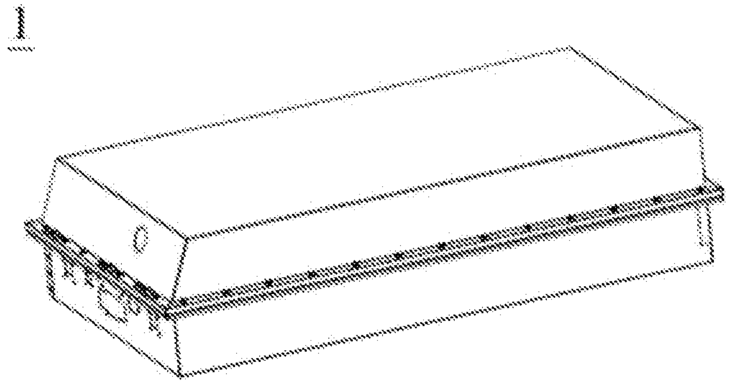
FIG. 4 is a schematic view of a battery pack according to an embodiment of the present application.
Figure 5:
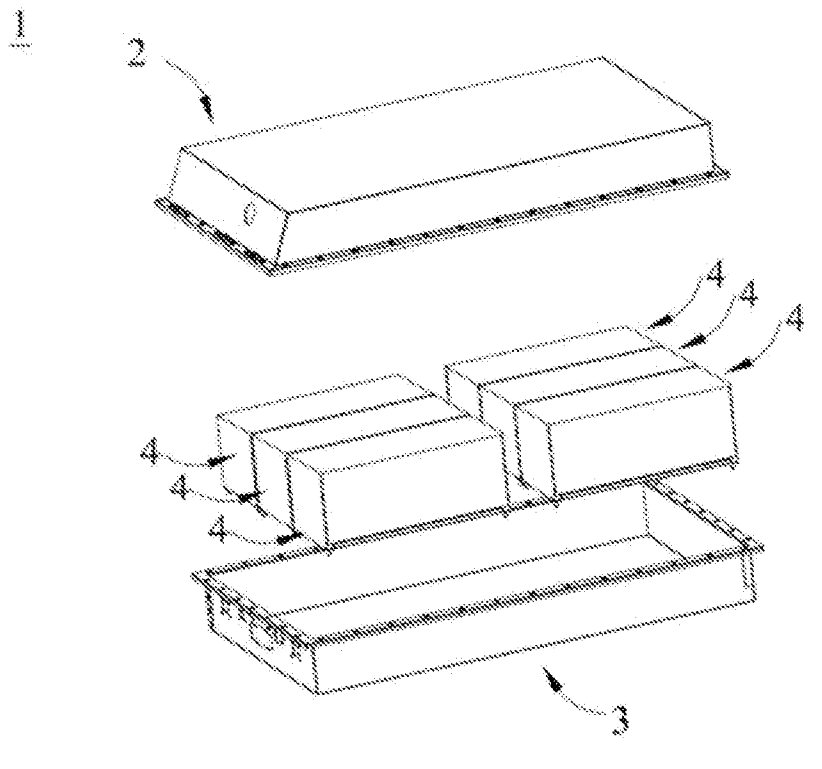
FIG. 5 is an exploded view of the battery pack according to the embodiment of the present application shown in FIG. 4.

FIGS. 4 and 5 show a battery pack 1 as an example. Referring to FIGS. 4 and 5, the battery pack 1 may comprise a battery box and a plurality of battery modules 4 provided in the battery box. The battery box includes an upper box 2 and a lower box 3, where the upper box 2 can cover the lower box 3 and forms an enclosed space for accommodating the battery module 4. The plurality of battery modules 4 may be arranged in the battery box in any manner.

In addition, the present application further provides an electrical apparatus, and the electrical apparatus includes at least one of the secondary battery, the battery module, or the battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus, the secondary battery, the battery module, or the battery pack can be selected according to its use requirements.

Figure 6:
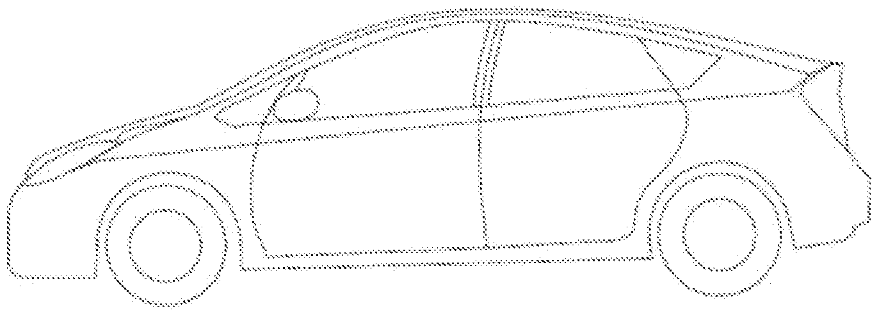
FIG. 6 is a schematic view of an electrical apparatus using a secondary battery according to an embodiment of the present application as a power source.

FIG. 6 is an example of an electrical apparatus. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the device may be a mobile phone, a tablet, a laptop, etc. The device is generally required to be light and thin, and can use a secondary battery as a power source.

Examples

Examples of the present invention will be described in detail hereinafter. The examples described below are exemplary and only used to explain the present application, and should not be construed as a limitation on the present application. Where specific techniques or conditions are not specified in the examples, the techniques or conditions described in the literatures of the art or the product specifications are followed. Where the manufacturers are not specified, the reagents or instruments used are conventional products which are commercially available.

(1) Preparation of Fluorine-Containing Copolymers

In a closed reaction kettle, nitrogen was purged to remove oxygen, and 400 g of deionized water, 0.05 g of dimethyl peroxydicarbonate as the initiator, 0.2 g of sodium carboxymethyl cellulose as the dispersant, 0.15 g of diethyl carbonate as the chain transfer agent, and 2.0 g of perfluoromethyl vinyl ether were added. Then the temperature of the reaction kettle was raised to 70° C., and the temperature fluctuation of the reaction kettle was controlled not to exceed 3° C. with cold water, the fluorine-containing ethylene monomer in the stoichiometric ratio shown in structural formula 1 was added with a membrane pump, the reaction pressure was kept at 9 MPa and the rotation speed was 1000 revolutions per minute. The reaction was terminated after 4 hours, and a copolymer slurry was obtained. The copolymer slurry was degassed at 100° C. with a stirring speed of 500 revolutions per minute, and unreacted monomers were recovered. Then, the copolymer slurry was washed with deionized water, and the polymer slurry was collected by a compressor. The collected copolymer slurry was dried at 100° C. to obtain the fluorine-containing copolymer represented by the structural formula 1 provided in the present application.

Other fluorine-containing copolymers of structural formulas 2 to 12 of the present application with different molecular weights and the fluorine-containing copolymer of structural formula 13 used in the comparative example can be synthesized by referring to the above preparation steps, wherein the size of the molecular weight was adjusted by adjusting the reaction temperature, reaction pressure and reaction time. Table 1 below shows the specific reaction conditions.

Structural formula 1

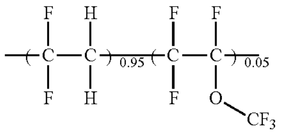

Structural formula 2

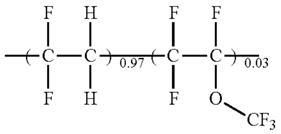

Structural formula 3

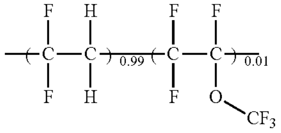

Structural formula 4

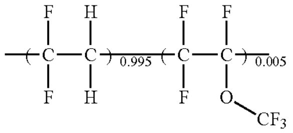

Structural formula 5

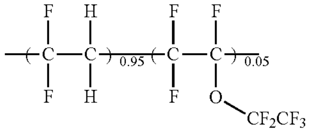

-continued

Structural formula 6

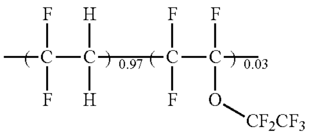

Structural formula 7

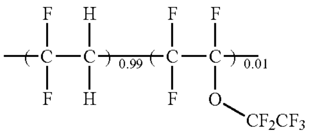

Structural formula 8

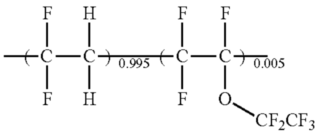

Structural formula 9

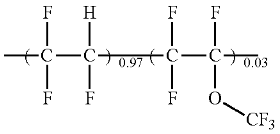

Structural formula 10

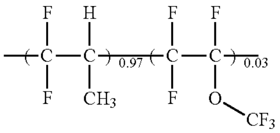

Structural formula 11

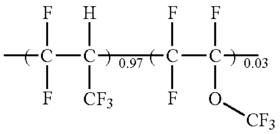

Structural formula 12

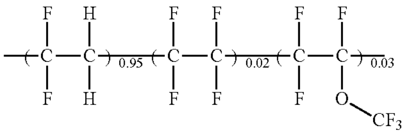

Structural formula 13

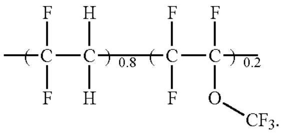

TABLE 1

| No. | Reaction temperature (° C.) | Reaction pressure (MPa) | The reaction time (hour) |
|---|---|---|---|
| Structural formula 1 | 70 | 9 | 4 |
| Structural formula 2 | 65 | 10 | 6 |
| Structural formula 3 | 60 | 11 | 5 |
| Structural formula 4 | 65 | 10 | 5 |
| Structural formula 5 | 50 | 10 | 5 |
| Structural formula 6 | 55 | 11 | 6 |

TABLE 1-continued

| No. | Reaction temperature (° C.) | Reaction pressure (MPa) | The reaction time (hour) |
|---|---|---|---|
| Structural formula 7 | 60 | 9 | 5 |
| Structural formula 8 | 45 | 10 | 6 |
| Structural formula 9 | 40 | 10.5 | 6 |
| Structural formula 10 | 50 | 10.5 | 5.5 |
| Structural formula 11 | 55 | 10 | 6 |
| Structural formula 12 | 60 | 11 | 5.5 |
| Structural formula 13 | 60 | 10 | 6 |

(2) Preparation of Positive Electrode Sheet

The positive active material (including positive electrode active material and optional lithium supplement (the mass ratio of each component is used when mixed)), acetylene black as the conductive agent and the binder at a weight ratio of 96:2:2 were dissolved in N-methylpyrrolidone (NMP) as the solvent. The mixture was well mixed by fully stirring to form a positive electrode slurry, and then the positive electrode slurry was uniformly coated on an aluminum foil as a positive electrode current collector. After drying and cold pressing, a positive electrode sheet with a positive electrode active material layer was obtained.

(3) Preparation of Negative Electrode Sheet

Artificial graphite as the negative electrode active material, acetylene black as the conductive agent, styrene butadiene rubber (SBR) as the binder, and sodium carboxymethyl cellulose (CMC-Na) as the thickener at a weight ratio of 94:2:2:2 were dissolved in deionized water as the solvent, and mixed uniformly with deionized water as the solvent to prepare a negative electrode slurry. Then, the negative electrode slurry was uniformly coated on a copper foil as a negative electrode current collector. After drying, cold pressing and slitting, a negative electrode sheet was obtained.

(4) Preparation of Electrolyte Solution

In a glove box under an argon atmosphere (atmosphere: $H_2O$<0.1 ppm, and $O_2$<0.1 ppm), 1 mol/L of $LiPF_6$ was dissolved in an organic solvent (EC/DMC/EMC=1/1/1 (weight ratio)), and then stirred well to obtain a corresponding electrolyte solution.

(5) Preparation of Secondary Battery

A polyethylene film with a thickness of 14 μm was used as the separator, and the above-mentioned positive electrode sheet and negative electrode sheet were wound into a bare battery cell with the separator placed therebetween. The bare battery cell was placed in an aluminum pouch film for battery case and dried, the above-mentioned electrolyte solution was then injected, and a secondary battery was prepared through processes such as chemical formation, and standing.

In the present application, the positive electrode materials and binders used in various examples and comparative examples are shown in Table 2 below. In the examples and comparative examples of the present application, as shown in comparative example 1 in Table 2 below, the particle diameter of carbon-coated $LiFePO_4$ as the first positive electrode active material is 1 μm, and the carbon-coated $LiFePO_4$ refers to $LiFePO_4$ coated by high temperature carbonization of carbon sources such as sucrose and glucose during sintering of materials; the particle diameter of carbon-coated $LiFeMnPO_4$ as the first positive electrode active material is 1 μm, and carbon-coated $LiFeMnPO_4$ refers to $LiFeMnPO_4$ coated by high temperature carbonization of carbon sources such as sucrose and glucose during sintering of materials; $LiNi_{0.8}Co_{0.01}Mn_{0.1}O_2$ as the second positive electrode active material has a pH value of 12.5, and a particle diameter Dv50 of 9.9 μm; $LiNi_{0.5}Co_{0.2}Mn_{0.3}O_2$ as the second positive electrode active material has a pH value of 11.4, and a particle size Dv50 of 5.2 μm. $Li_5FeO_4$ as the lithium supplement has a pH value of 12.7. Unless otherwise specified, the materials shown in Table 2 below are all commercially available. The symbol "/" in the table below indicates that the corresponding parameter cannot be determined.

Experimental Example

In the present application, the pH values of the positive electrode active material and the lithium supplement contained in the positive electrode material were determined as follows.

(1) Test Method for pH Value:

1) 5 g of positive electrode active material or powder sample of lithium supplement were weighed in a conical flask;
2) the powder sample and deionized water as the solvent were added to the above conical flask in a ratio of 1:9 by mass, a magnetic rotor was placed and the conical flask was sealed with sealing film;
3) the above conical flask was placed in the center of a magnetic stirring table and stirred for 30 minutes;
4) the obtained product was allowed to stand for 1.5 hours after stirring; and
5) a calibrated pH electrode (pH meter model: S220/Mettler pH meter) was soaked in the solution, and the pH value was read after stabilization for 30 seconds.

(2) Test Method for the Weight Average Molecular Weight of Fluorine-Containing Copolymers:

The test was performed via a gel permeation chromatographer (instrument model: Wasters-2100), test conditions: solvent: dimethylformamide (DMF), and test temperature: 40° C.

1) Preparation of mobile phase: DMF was filtered through a 5# sand core funnel for later use;
2) Preparation of solution: 5 mL of the solution of the sample to be tested (concentration: 0.1%-0.5%) was dissolved, and then filtered through a 5# sand core funnel for later use;
3) Start-up of Wasters-2100 chromatographer: a. DMF was poured into a solvent bottle of the chromatographer, and a recovery bottle was connected to the outlet of the chromatographer; b. a pump was turned on, the flow rate was adjusted from small to large, and the final flow rate was stabilized at 1.0 mL/min; c. a differential refraction detector was turned on, so that the eluent was flowed back through the reference cell, and the flow path was switched back to its original position before the sample was injected; and d. the computer was turned on and on-line record was performed;
4) the computer was turned on and on-line record was performed;
5) Sample injection: after the recorded baseline was stable, 50 uL of sample was drawn via a sample injection syringe and injected into a sample injector.
6) the sample injector should be cleaned at the end of the test and then shut down in sequence.

(3) Stability Characterization Method for Positive Electrode Slurry 1) the positive electrode slurry was placed in a 500 mL glass cup, covered with plastic wrap and allowed to stand, and the initial time for the positive electrode slurry to stand was recorded;

2) the gelation state of the positive electrode slurry after standing for different times was observed, and the gelation state was divided into the following grades:

a. No gelation: the positive electrode slurry has good fluidity, and the positive electrode slurry can be quickly leveled when it flows down and falls on the plane;

b. Mild gelation: the positive electrode slurry has good fluidity, but there are obvious reflections on the surface of positive slurry, and the positive electrode slurry can be quickly leveled when it flows down and falls on the plane, and the surface of the positive electrode slurry is protruding;

c. Moderate gelation: the positive electrode slurry has poor fluidity and is flocculent; the positive electrode slurry is in a flocculent type, but is not solid in nature; no jelly-like lumps; and d. Severe gelation: the positive electrode slurry has no fluidity and is jelly-like; the positive electrode slurry is solid in nature and has no fluidity, and can be picked up in one piece.

(4) Adhesiveness Test for Positive Electrode Sheet

The coated and cold-pressed positive electrode sheet was cut into a rectangle with a length of 100 mm and a width of 10 mm. A stainless steel plate with a width of 25 mm was pasted with a double-sided adhesive tape (with a width of 11 mm), the cut positive electrode sheet was pasted on the double-sided adhesive tape on the stainless steel plate, and the surface thereof was rolled back and forth three times with a 2000 g roller (300 mm/min). The electrode sheet was bent 180 degrees and manually peeled off by 25 mm, the sample was fixed on a testing machine, the peeling face was kept in line with a testing machine force line, a continuous peeling was performed at 300 mm/min via the testing machine to obtain a peeling force curve, the average value of a smooth stage was taken as the peeling force F0, and the binding force F for the test positive electrode sheet was: F=F0/0.01=100F0 (N/m).

(5) Flexibility Characterization Method for Positive Electrode Sheet 1) the cold-pressed electrode sheet was cut into samples with an area of 100 $cm^2$ (4 cm×25 cm in longitudinal direction), and the samples were taken in TD direction (transverse direction) with the sample number of 4 or more;

2) the sample was pre-folded in half (folded in half in the longitudinal direction with a length of 25 cm) (i.e. folded gently to align the short side);

3) the pre-folded experimental film was placed on the plane of the test table, and rolled once with a 2 kg cylindrical roller; and 4) the experimental sample was folded back along the longitudinal crease. The crease was observed under light, the qualified products were not translucent and not broken; and the defective products were translucent and broken.

TABLE 2

| | Positive electrode material (mass ratio when mixed) | Binder | Gelation of positive electrode slurry for 24 hours | Adhesiveness for positive electrode sheet | Flexibility for positive electrode sheet |
|---|---|---|---|---|---|
| Comparative Example 1 | $LiNi_{0.8}Co_{0.1}Mn_{0.1}O_2$:carbon-coated $LiFePO_4$ = 90:10 | PVDF binder formed by copolymerizing VDF monomer and acrylic monomer (brand: Solvay 5130) | Severe physical gelation | / | / |
| Comparative Example 2 | $LiNi_{0.8}Co_{0.1}Mn_{0.1}O_2$:carbon-coated $LiFePO_4$ = 90:10 | Homopolymerized PVDF | Severe chemical gelation | / | / |
| Comparative Example 3 | Carbon-coated $LiFePO_4$ | PVDF binder formed by copolymerizing VDF monomer and acrylic monomer (brand: Solvay 5130) | Severe physical gelation | / | / |
| Comparative Example 4 | Carbon-coated $LiFePO_4$ | Homopolymerized PVDF (brand: Arkema HSV900) | No gelation | 20N/m | Opaque to light when folded in half for four times |
| Comparative Example 5 | Carbon-coated $LiFePO_4$:$Li_5FeO_4$ = 95:5 | PVDF binder formed by copolymerizing VDF monomer and acrylic monomer (brand: Solvay 5130) | Severe physical gelation | / | / |
| Comparative Example 6 | Carbon-coated $LiFePO_4$:$Li_5FeO_4$ = 95:5 | Homopolymerized PVDF (brand: Arkema HSV900) | Severe chemical gelation | / | / |

TABLE 2-continued

| | Positive electrode material (mass ratio when mixed) | Binder | Gelation of positive electrode slurry for 24 hours | Adhesiveness for positive electrode sheet | Flexibility for positive electrode sheet |
|---|---|---|---|---|---|
| Comparative Example 7 | $LiNi_{0.8}Co_{0.1}Mn_{0.1}O_2$ | PVDF binder formed by copolymerizing VDF monomer and acrylic monomer (brand: Solvay 5130) | No gelation | 40N/m | Opaque to light when folded in half for three times |
| Comparative Example 8 | $LiNi_{0.8}Co_{0.1}Mn_{0.1}O_2$ | Homopolymerized PVDF (brand: Arkema HSV900) | Severe chemical gelation | / | / |
| Comparative Example 9 | $LiNi_{0.8}Co_{0.1}Mn_{0.1}O_2$:$Li_5FeO_4$ = 95:5 | PVDF binder formed by copolymerizing VDF monomer and acrylic monomer (brand: Solvay 5130) | No gelation | 27N/m | Opaque to light when folded in half for three times |
| Comparative Example 10 | $LiNi_{0.8}Co_{0.1}Mn_{0.1}O_2$:$Li_5FeO_4$ = 95:5 | Homopolymerized PVDF (brand: Arkema HSV900) | Severe chemical gelation | / | / |
| Comparative Example 11 | $LiNi_{0.8}Co_{0.1}Mn_{0.1}O_2$:carbon-coated $LiFePO_4$ = 90:10 | Structural formula 1 with a molecular weight of 500,000 | Slurry settling | / | / |
| Comparative Example 12 | $LiNi_{0.8}Co_{0.1}Mn_{0.8}O_2$:carbon-coated $LiFePO_4$ = 90:10 | Structural formula 1 with a molecular weight of 2,500,000 | Severe physical gelation | / | / |
| Comparative Example 13 | $LiNi_{0.8}Co_{0.1}Mn_{0.1}O_2$:carbon-coated $LiFePO_4$ = 90:10 | Structural formula 5 with a molecular weight of 2,500,000 | Severe physical gelation | / | / |
| Comparative Example 14 | $LiNi_{0.8}Co_{0.1}Mn_{0.1}O_2$:carbon-coated $LiFePO_4$ = 90:10 | Structural formula 13 with a molecular weight of 600,000 | No gelation | 7N/m | / |
| Example 1 | Carbon-coated $LiFePO_4$ | Structural formula 3 with a molecular weight of 900,000 | No gelation | 30N/m | Opaque to light when folded in half for three times |
| Example 2 | Carbon-coated $LiFePO_4$:$Li_5FeO_4$ = 95:5 | Structural formula 3 with a molecular weight of 900,000 | No gelation | 23N/m | Opaque to light when folded in half for five times |
| Example 3 | $LiNi_{0.8}Co_{0.1}Mn_{0.1}O_2$ | Structural formula 3 with a molecular weight of 900,000 | No gelation | 28N/m | Opaque to light when folded in half for five times |
| Example 4 | $LiNi_{0.8}Co_{0.1}Mn_{0.1}O_2$:$Li_5FeO_4$ = 95:5 | Structural formula 3 with a molecular weight of 900,000 | No gelation | 31N/m | Opaque to light when folded in half for four times |
| Example 5 | Carbon-coated $LiFePO_4$:$LiNi_{0.8}Co_{0.1}Mn_{0.1}O_2$:$Li_5FeO_4$ = 5:90:5 | Structural formula 3 with a molecular weight of 900,000 | No gelation | 25N/m | Opaque to light when folded in half for four times |

TABLE 2-continued

| | Positive electrode material (mass ratio when mixed) | Binder | Gelation of positive electrode slurry for 24 hours | Adhesiveness for positive electrode sheet | Flexibility for positive electrode sheet |
|---|---|---|---|---|---|
| Example 6 | $LiNi_{0.8}Co_{0.1}Mn_{0.1}O_2$:carbon-coated $LiFePO_4$ = 90:10 | Structural formula 9 with a molecular weight of 900,000 | No gelation | 20N/m | Opaque to light when folded in half for three times |
| Example 7 | $LiNi_{0.8}Co_{0.1}Mn_{0.1}O_2$:carbon-coated $LiFePO_4$ = 90:10 | Structural formula 10 with a molecular weight of 1,000,000 | No gelation | 27N/m | Opaque to light when folded in half for four times |
| Example 8 | $LiNi_{0.8}Co_{0.1}Mn_{0.1}O_2$:carbon-coated $LiFePO_4$ = 90:10 | Structural formula 11 with a molecular weight of 1,100,000 | No gelation | 25N/m | Opaque to light when folded in half for five times |
| Example 9 | $LiNi_{0.8}Co_{0.1}Mn_{0.1}O_2$:carbon-coated $LiFePO_4$ = 90:10 | Structural formula 12 with a molecular weight of 1,200,000 | No gelation | 26N/m | Opaque to light when folded in half for four times |
| Example 10 | $LiNi_{0.8}Co_{0.1}Mn_{0.1}O_2$:carbon-coated $LiFePO_4$ = 90:10 | Structural formula 3 with a molecular weight of 900,000 | No gelation | 29N/m | Opaque to light when folded in half for five times |
| Example 11 | $LiNi_{0.8}Co_{0.1}Mn_{0.1}O_2$:carbon-coated $LiFePO_4$ = 90:10 | Structural formula 2 with a molecular weight of 600,000 | No gelation | 33N/m | Opaque to light when folded in half for five times |
| Example 12 | $LiNi_{0.8}Co_{0.1}Mn_{0.1}O_2$:carbon-coated $LiFePO_4$ = 90:10 | Structural formula 3 with a molecular weight of 900,000 | No gelation | 23N/m | Opaque to light when folded in half for five times |
| Example 13 | $LiNi_{0.8}Co_{0.1}Mn_{0.1}O_2$:carbon-coated $LiFePO_4$ = 90:10 | Structural formula 3 with a molecular weight of 1,100,000 | No gelation | 25N/m | Opaque to light when folded in half for five times |
| Example 14 | $LiNi_{0.8}Co_{0.1}Mn_{0.1}O_2$:carbon-coated $LiFePO_4$ = 90:10 | Structural formula 3 with a molecular weight of 1,500,000 | No gelation | 29N/m | Opaque to light when folded in half for five times |
| Example 15 | $LiNi_{0.8}Co_{0.1}Mn_{0.1}O_2$:carbon-coated $LiFePO_4$ = 90:10 | Structural formula 7 with a molecular weight of 1,100,000 | No gelation | 25N/m | Opaque to light when folded in half for four times |
| Example 16 | $LiNi_{0.8}Co_{0.1}Mn_{0.1}O_2$:carbon-coated $LiFePO_4$ = 90:10 | Structural formula 8 with a molecular weight of 1,100,000 | No gelation | 27N/m | Opaque to light when folded in half for five times |
| Example 17 | $LiNi_{0.5}Co_{0.2}Mn_{0.3}O_2$:carbon-coated $LiFePO_4$ = 90:10 | Structural formula 3 with a molecular weight of 1,200,000 | No gelation | 27N/m | Opaque to light when folded in half for five times |

TABLE 2-continued

| | Positive electrode material (mass ratio when mixed) | Binder | Gelation of positive electrode slurry for 24 hours | Adhesiveness for positive electrode sheet | Flexibility for positive electrode sheet |
|---|---|---|---|---|---|
| Example 18 | $LiNi_{0.5}Co_{0.2}Mn_{0.3}O_2$:carbon-coated $LiFeMnPO_4$ = 90:10 | Structural formula 4 with a molecular weight of 1,100,000 | No gelation | 25 N/m | Opaque to light when folded in half for four times |
| Example 19 | Carbon-coated $LiFePO_4$:$Li_5FeO_4$ = 95:5 | Structural formula 5 with a molecular weight of 1,300,000 | No gelation | 30N/m | Opaque to light when folded in half for five times |
| Example 20 | Carbon-coated $LiFeMnPO_4$:$Li_5FeO_4$ = 95:5 | Structural formula 6 with a molecular weight of 1,150,000 | No gelation | 31N/m | Opaque to light when folded in half for five times |

It can be seen from Table 2 that the positive electrode slurries of examples 1 to 20 did not gel within 24 hours after preparation (neither physical gelation nor chemical gelation), and had good fluidity. In addition, while the above-mentioned positive electrode slurry had good fluidity within a certain period of time, the fluorine-containing copolymer of the present application had good flexibility due to the fluorine-substituted ether group introduced into the molecular chain while maintaining good adhesiveness, so that the resulting positive electrode sheet had good flexibility.

In contrast, it can be seen from comparative examples 1 to 14 that when using PVDF binders formed by copolymerizing VDF monomers and acrylic monomers or homopolymerized PVDF as binders for positive electrode slurry, the positive electrode slurry showed severe physical gelation or severe chemical gelation within 24 hours; and when the weight average molecular weight of the fluorine-containing copolymer did not meet the range defined in the present application, the problem of precipitation for positive electrode slurry (when the weight average molecular weight was low) or severe physical gelation for positive electrode slurry (when the weight average molecular weight was high) arose.

It should be noted that the present application is not limited to the embodiments above. The above-described embodiments are merely exemplary, and embodiments having substantially the same technical idea and the same effects within the scope of the technical solution of the present application are all included in the technical scope of the present application. In addition, without departing from the scope of the subject matter of the present application, various modifications applied to the embodiments that can be conceived by those skilled in the art, and other modes constructed by combining some of the constituent elements of the embodiments are also included in the scope of the present application.

The invention claimed is:

1. A positive electrode slurry comprising:

a positive electrode material; and a binder comprising a fluorine-containing copolymer having a weight average molecular weight of 600,000 to 2,000,000 and represented by following formula:

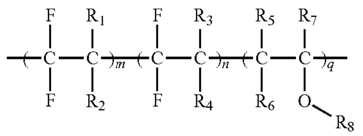

wherein:

one of $R_1$ and $R_2$ is one selected from H and unsubstituted or non-perfluoro-substituted C1-C8 linear or branched alkyl, and another one of $R_1$ and $R_2$ is H, F, or C1-C8 linear or branched alkyl substituted or unsubstituted with fluorine;

$R_3$ and $R_4$ are each independently selected from H, F, or C1-C8 linear or branched alkyl substituted or unsubstituted with fluorine;

$R_5$-$R_7$ are each independently selected from H, F, or C1-C8 linear or branched alkyl substituted or unsubstituted with fluorine;

$R_8$ is one of perfluoro-substituted C1-C8 linear or branched alkyl; and m, n, and q are molar proportions of respective repeating units in the fluorine-containing copolymer, $m \geq 90\%$, $0<n<100\%$, and $0<q<100\%$, and $97\%<m+n \leq 99.9\%$.

2. The positive electrode slurry according to claim 1, wherein the positive electrode material comprises a carbon-coated lithium-containing phosphate material.

3. The positive electrode slurry according to claim 2, wherein the positive electrode material further comprises a lithium supplement, and a pH value of the lithium supplement is greater than or equal to 10.0.

4. The positive electrode slurry according to claim 3, wherein the lithium supplement comprises at least one selected from $Li_2C_2$, $Li_3N$, $Li_2S$, $Li_6CoO_4$, $Li_5FeO_4$, $Li_3VO_4$, $Li_2MoO_3$, $Li_2RuO_3$, $Li_2MnO_2$, $Li_2NiO_2$, and $Li_2Cu_xN_{1-x}M_yO_2$, where $0<x\leq 1$ and $0\leq y<0.1$, and M is at least one selected from Zn, Sn, Mg, Fe, and Mn.

5. The positive electrode slurry according to claim 2, wherein:

the carbon-coated lithium-containing phosphate material is a first positive electrode active material;

the positive electrode material further comprises a second positive electrode active material represented by following general formula:

$Li_{1+a}[Ni_xCo_yMn_zM_b]O_2$, where $0.6<x<1$, $0\leq y<0.3$, $0\leq z<0.3$, $0<a<0.2$, $0<b<0.2$, $x+y+z+b=1$, M is one or more selected from Mg, Ca, Sb, Ce, Ti, Zr, Sr, Al, Zn, Mo, and B; and a pH value of the second positive electrode active material is greater than or equal to 10.0.

6. The positive electrode slurry according to claim 5, wherein the positive electrode material further comprises a lithium supplement.

7. The positive electrode slurry according to claim 2, wherein:

the positive electrode material comprises a positive electrode active material represented by following general formula:

$Li_{1+a}[Ni_xCo_yMn_zM_b]O_2$, where $0.8<x<1$, $0\leq y<0.3$, $0\leq z<0.3$, $0<a<0.2$, $0<b<0.2$, $x+y+z+b=1$, M is one or more selected from Mg, Ca, Sb, Ce, Ti, Zr, Sr, Al, Zn, Mo, and B; and a pH value of the positive electrode material is greater than or equal to 10.0.

8. The positive electrode slurry according to claim 2, wherein the carbon-coated lithium-containing phosphate material has a volume average particle size Dv50 of 2 μm or less.

9. The positive electrode slurry according to claim 1, wherein:

the positive electrode material comprises a positive electrode active material represented by following general formula:

$Li_{1+a}[Ni_xCo_yMn_zM_b]O_2$, where $0.6<x<1$, $0\leq y<0.3$, $0\leq z<0.3$, $0<a<0.2$, $0<b<0.2$, $x+y+z+b=1$, M is one or more selected from Mg, Ca, Sb, Ce, Ti, Zr, Sr, Al, Zn, Mo, and B, optionally, $0.8<x<1$; and a pH value of the positive electrode material is greater than or equal to 10.0.

10. The positive electrode slurry according to claim 9, wherein the positive electrode material further comprises a lithium supplement.

11. The positive electrode slurry according to claim 1, wherein $m>90\%$.

12. The positive electrode slurry according to claim 1, wherein $0<q\leq 1\%$.

13. A secondary battery comprising:

a positive electrode sheet having a positive electrode active material layer obtained by coating and drying a positive electrode slurry comprising:

a positive electrode material; and a binder comprising a fluorine-containing copolymer having a weight average molecular weight of 600,000 to 2,000,000 and represented by following formula:

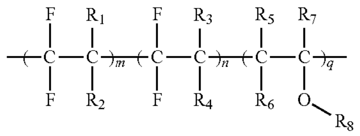

wherein:

one of $R_1$ and $R_2$ is one selected from H and unsubstituted or non-perfluoro-substituted C1-C8 linear or branched alkyl, and another one of $R_1$ and $R_2$ is H, F, or C1-C8 linear or branched alkyl substituted or unsubstituted with fluorine;

$R_3$ and $R_4$ are each independently selected from H, F, or C1-C8 linear or branched alkyl substituted or unsubstituted with fluorine;

$R_5$-$R_7$ are each independently selected from H, F, or C1-C8 linear or branched alkyl substituted or unsubstituted with fluorine;

$R_8$ is one of perfluoro-substituted C1-C8 linear or branched alkyl; and m, n, and q are molar proportions of respective repeating units in the fluorine-containing copolymer, $m\geq 90\%$, $0<n<100\%$, and $0<q<100\%$, and $97\%<m+n\leq 99.9\%$.

14. A battery module, comprising the secondary battery according to claim 13.

15. A battery pack, comprising the battery module according to claim 14.

16. An electrical apparatus, comprising the secondary battery according to claim 13.

* * * * *